United States Patent [19]
Mani

[11] 3,901,779

[45] Aug. 26, 1975

[54] VINYL ESTER RESIN AND PROCESS FOR CURING SAME WITH IONIZING RADIATION IN THE PRESENCE OF AMINES

[75] Inventor: Inder Mani, Midland, Mich.

[73] Assignee: The Dow Chemical Company, Midland, Mich.

[22] Filed: Aug. 27, 1973

[21] Appl. No.: 391,691

Related U.S. Application Data

[62] Division of Ser. No. 143,268, May 13, 1971, Pat. No. 3,810,826.

[52] U.S. Cl...... 204/159.16; 117/93.31; 117/132 B; 117/132 BE; 117/161 ZB; 117/161 UZ; 204/159.15; 204/159.18; 204/159.19; 204/159.23; 260/836; 260/837 R
[51] Int. Cl............................ C08d 1/00; C08f 1/00
[58] Field of Search..... 204/159.15, 159.19, 159.16; 260/836, 837 R

[56] References Cited
UNITED STATES PATENTS

| | | | |
|---|---|---|---|
| 2,673,151 | 3/1954 | Gerhart | 96/115 P |
| 3,301,743 | 7/1967 | Fekete | 260/837 R |
| 3,367,992 | 2/1968 | Bearden | 260/837 R |
| 3,420,914 | 1/1969 | May | 260/837 R |
| 3,669,911 | 6/1972 | Najvar | 260/2.5 N |
| 3,676,398 | 7/1972 | D'Alelio | 260/837 R |
| 3,683,045 | 8/1972 | Baldwin | 260/837 R |

*Primary Examiner*—Murray Tillman
*Assistant Examiner*—Richard B. Turer
*Attorney, Agent, or Firm*—H. L. Aamoth

[57] ABSTRACT

The addition of about 1.5 to 5 weight percent of certain amines to a thermosettable mixture of a nonvolatile vinyl monomer and a polymerizable vinyl ester resin reduces the dosage level of ionizing radiation required to cure the mixture.

4 Claims, No Drawings

VINYL ESTER RESIN AND PROCESS FOR CURING SAME WITH IONIZING RADIATION IN THE PRESENCE OF AMINES

CROSS-REFERENCE TO RELATED APPLICATION

This is a division of application Ser. No. 143,268 filed May 13, 1971, now U.S. Pat. No. 3,810,826.

BACKGROUND OF THE INVENTION

This invention relates to the field of ionizing radiation cure of polymerizable materials and to coatings of same and especially relates to a promoter to reduce the ionizing radiation level or dosage necessary to effect a cure of said materials.

From a commercial standpoint radiation curing offers a number of advantages over thermal catalyst-initiated cures: immediate initiation of polymerization, extended pot-life of the curable materials, little temperature rise so heat sensitive substrates may be employed in coatings, better control of the polymerization reaction, superior substrate-coating bonds are produced and much higher concentration of radicals may be produced instantaneously. However, these advantages are difficult to realize if the curable materials require high curing doses of ionizing radiation since the economics become prohibitive. Commerialization then depends on reducing the cost of the curing process by finding methods and materials to effect a cure at lower dosages.

The search for means to accelerate or promote radiation curing is evident by a number of patents relating to certain polymerizable materials. While neither the promoters or the polymerizable materials employed correspond in any way to this invention, patents representative of such efforts include U.S. Pat. Nos. 3,202,513; 3,251,759; 3,265,604; 3,352,771 and 2,979,446. Commercially it is desirable to be able to cure at dosages of no more than 2 to 3 megarads but it would be of great advantage to be able to cure at 1 megarad and preferably even less.

SUMMARY OF THE INVENTION

According to this invention the curing dosage of ionizing radiation required to cure in an inert atmosphere a mixture of a nonvolatile vinyl monomer and a polymerizable vinyl ester resin is reduced by adding to the mixture at least 0.3 weight percent of certain nitrogen containing materials.

The vinyl ester resin is prepared by reacting about equivalent amounts of a dicarboxylic acid half ester having the formula

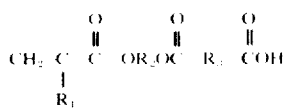

wherein $R_1$ is hydrogen or an alkyl group of 1 to 4 carbons, $R_2$ is an alkylene group of 2 to 6 carbons and $R_3$ is phenylene, cyclohexylene, alkylene or an unsaturated bivalent hydrocarbon radical, with a polyepoxide of a polyhydric phenol having more than one epoxide group per molecule. The nitrogen materials include various 2-oxazolines, guanidines and certain amines which are more fully described hereafter.

DESCRIPTION OF THE INVENTION

The general methods by which vinyl ester resins may be prepared are thoroughly described in the patent literature. Representative patents which describe the resins and their preparation include U.S. Pat. Nos. 3,066,112; 3,179,623; 3,256,226; 3,301,743 and 3,377,406.

In particular the vinyl ester resins employed in this invention are described in U.S. Pat. No. 3,367,992 along with methods for their preparation. More particularly this invention relates to said resins prepared from polyepoxides of polyhydric phenols having more than one epoxide group per molecule.

The vinyl ester resins are prepared by reaction of essentially equivalent amounts of said polyepoxide of a polyhydric phenol and a dicarboxylic acid half ester having the formula

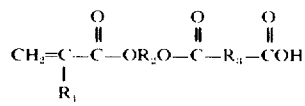

where $R_1$ is hydrogen or an alkyl group of 1 to 4 carbons, $R_2$ is an alkylene group of 2 to 6 carbons and $R_3$ is phenylene, cyclohexylene, alkylene or an unsaturated bivalent hydrocarbon radical.

Said half esters are conveniently prepared by esterification of a hydroxyalkyl acrylate or methacrylate with an equal molar amount of a dicarboxylic acid, or preferably a dicarboxylic acid anhydride where it exists. For example, equal molar amounts of 2-hydroxyethyl acrylate and maleic anhydride may be reacted to form said half ester. Accordingly $R_1$ in the formula is usually hydrogen or methyl. In place of 2-hydroxyethyl acrylate one may employ hydroxypropyl or hydroxybutyl acrylate or methacrylate. Also, in place of maleic anhydride or maleic acid one may employ fumaric acid, itaconic acid, citraconic acid, adipic acid, the isomeric phthalic acids and the like. The anhydrides of said acids, where available, may also be used.

Said half ester is reacted with a polyepoxide of a polyhydric phenol wherein the polyepoxide has an epoxide equivalent weight of about 150 up to 1000 and even higher. Said polyepoxides are made by reacting at least about two moles of an epihalohydrin, such as epichlorohydrin, with one mole of a polyhydric phenol and a sufficient amount of an alkali to combine with the halogen of the halohydrin. Polyhydric phenols include the familiar bisphenol A as well as p,p'-dihydroxydiphenyl, p,p'-dihydroxyphenyl sulfone, p,p'-dihydroxybenzophenone, p,p'-dihydroxydisphenylmethane, the various other position isomers of the above polyhydric phenols, polyhydric phenolic formaldehyde condensation products (novolac resins) and the like. Mononuclear phenols such as resorcinol, catechol, hydroquinone, phloroglucinol and the like may also be employed. The polyepoxides are characterized in having more than one epoxide group per molecule.

Various catalysts may be used in the preparation of vinyl ester resins. Catalysts include tertiary amines such as tris(dimethylaminomethyl)phenol, onium catalysts, triphenyl stibine and triphenyl phosphine and the like. Usually hydroquinone or other like polymerization inhibitors are added to prevent polymerization during the preparation of the resin.

According to this invention the polymerizable materials comprise a mixture of said vinyl ester resin with a copolymerizable vinyl monomer which is nonvolatile. By nonvolatile it is meant to exclude monomers which are predominantly gases at ambient temperatures. It is obvious that if the monomer is too volatile a substantial portion of the monomer would evaporate from a film or coating before the mixture of monomer and resin could be cured. Monomers which are normally liquid at room temperature may be used even though there may be a small loss of monomer by evaporation. It is possible to operate the process of this invention under higher pressures than atmospheric pressure to minimize any loss of said normally liquid monomers.

Nonvolatile vinyl monomers which may be employed with this invention include both mono-and polyunsaturated monomers. Polymerizable monounsaturated acids include alkenyl aromatic monomers such as styrene, vinyl toluene, chlorostyrenes and the like; vinyl carboxylic acids such as acrylic and methacrylic acid; vinyl nitriles such as acrylonitrile and methacrylonitrile; alkyl and hydroxyalkyl esters of vinyl carboxylic acids, wherein the alkyl groups contains from 1 to 8 carbons, such as methyl acrylate, butyl acrylate, methyl ester of cinnamic acid, cyclohexyl methacrylate, hydroxyethyl methacrylate, hydroxypropyl acrylate hydroxybutyl acrylate and the like; vinyl amide monomers such as acryamide, diacetone acrylamide and the like; or mixtures thereof.

A variety of polyunsaturated polymerizable monomers within the above classes may be used including ethylene glycol dimethacrylate, trimethylol propane trimethacrylate, methylene bisacrylamide and other similar monomers.

The polymerizable materials of this invention are especially useful in coating various substrates such as metal, wood and the like either as a primer coating and/or a finished coating. In order to obtain the benefits of this invention at least 0.3 weight percent of the nitrogen containing material is added to the polymerizable materials. While quite large amounts of the nitrogen containing material may be added there is no advantage in doing so. Preferably the amount ranges from about 0.5 to 10 weight percent and most preferably from about 1.5 to 5 weight percent.

When employed as coating formulations other additives may be incorporated into the coating, for example, various inert fillers and pigments such as kaolin clay, titanium dioxide, silica, various inorganic oxides and the like. Films cast from the coating formulations may be rapidly cured by exposing them in an inert atmosphere to ionizing radiation (accelerated particulate radiation). A beam intensity of at least 50 microamperes is usually employed, but this invention is not limited thereto and lower beam intensities may be employed.

Generally the films or coatings will range in thickness from about 0.1 mil up to about 10 mils. However, depending on the accelerating voltage, thicknesses up to 250 mils or higher are feasible. The radiation curing step should be performed in an inert atmosphere. By this it is meant an atmosphere which is essentially free of oxygen since the presence of oxygen may result in an undesirable tacky surface. It is sufficient for this purpose to place a thin film of a plastic material such as a polyester (Mylar) film on the cast film or coating. Other means may be used such as curing in a chamber containing an essentially oxygen free atmosphere such as nitrogen, helium, argon and the like.

Accelerated particulate (ionizing) radiation includes particles such as electrons, protons, deuterons, other ions and the like. However, from an industrial standpoint, the cost and availability of machines limit ionizing radiation curing to accelerated electrons for the immediate future. A variety of devices are available to provide accelerated electron radiation or varying voltages and beam intensities. Typical of such devices is the familiar Van de Graaf accelerator. Similar commercial accelerators utilizing various acceleration means are available from Texas Nuclear Corporation, (cascade rectified system) High Voltage Engineering, (insulated core transformer system) General Electric (a resonant transformer design) and Radiation Dynamics, Inc. (radio frequency cascade rectifier system).

Nitrogen containing materials include 2-oxazolines, guanidines and certain amines. Typical of the 2-oxazolines are 2-oxazoline itself, and substituted 2-oxazolines having the formula

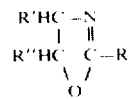

wherein R' and R'' may be hydrogen, methyl, ethyl, phenyl and the like. R may be an alkyl, aryl, aralkyl group or H. Such substituted oxazolines include 2-methyl-2-oxazoline, 2,5-diphenyl-2-oxazoline; 2-phenyl, 5-methyl-2-oxazoline; 2-methyl, 5-phenyl-2-oxazoline and the like. Also included within the term 2-oxazolines are the bis oxazolines such as 2,2'-tetramethylene bis(2-oxazoline), 2,2'-oxydiethylene bis(2-oxazoline; 2,2'-thiodiethylene bis(2-oxazoline) and the like. Guanidines include guanidine, tetramethyl guanidine and the like.

Amines which may be employed have the formula $R_1R_2R_3N$ wherein $R_1$ may be an alkyl or an aralkyl group, $R_2$ and $R_3$ each may be hydrogen or an alkyl group or $R_2$ and $R_3$ together may be a cyclic alkylene radical or an oxydialkylene radical. Alkyl groups include methyl, ethyl propyl, n-butyl, isobutyl and higher alkyl groups. Typical amines include mono-, di- and tri-n-butyl amine, di-isobutyl amine, triethyl amine, cyclohexylamine, benzyl amine, morpholine, piperidine and the like.

The following non-limiting examples will further illustrate the invention. All parts and percentages are by weight unless otherwise specified.

EXAMPLE 1

A vinyl ester resin was prepared by reacting 2-hydroxyethyl acrylate (30.5%) with maleic anhydride (25%) to form a half ester which was subsequently reacted with a glycidyl polyether of bisphenol A having an epoxide equivalent weight (EEW) of 186–192 (D.E.R. 331) according to the procedure of U.S. Pat. No. 3,367,992. The resin was then mixed with a monomer in the weight proportion of 2/1 respectively. The monomer of Resin A-1 was n-butyl acrylate and the monomer of Resin B-1 was styrene. The monomer of Resin C-1 was cellosolve acrylate (60/40). To these mixtures was added 3% of various nitrogen containing compounds.

A film was cast from each of the resin mixtures with a 7 mil draw-down bar on a Q-panel (4 inches × 12 inches × 0.03 inch) and covered with a 2 mil sheet of Mylar (polyester) film to exclude air. The coated polished steel Q panel was then passed through a 2 Mev electron beam from a Van de Graaf accelerator filtered with 0.33 gm/cm$^2$ Al. A 50 microampere beam current and a conveyor speed of 3.4 cm/sec delivered a dose of 0.1 Megarad (Mrad) for each pass through the beam.

The curing dose in megarads (Mrad) for each of the coated panels is shown below.

| Nitrogen Additive | Resin A-1 | Resin B-1 | Resin C-1 |
|---|---|---|---|
| None | 0.9–1.0 Mrad | 1.6 Mrad | 1.1–1.2 |
| di-n-butyl amine | 0.3 | 0.6 | 0.3–0.4 |
| tetramethyl guanidine | 0.3–0.4 | 0.8 | — |
| 2-oxazoline | 0.4–0.5 | 0.7–0.8 | — |
| triethyl amine | 0.3 | — | 0.3–0.4 |
| piperidine | 0.3 | 0.6–0.7 | 0.3 |
| morpholine | 0.3 | — | 0.3–0.4 |
| benzylamine | 0.4 | 0.8 | 0.6–0.7 |
| 2,2'-tetramethylene bis(2-oxazoline) | 0.4–0.5 | 0.7–0.8 | 0.5–0.6 |

EXAMPLE 2

When the resin of the previous example was mixed with 2-hydroxyethyl acrylate (1/1). The mixture required 0.4 Mrad to cure. The addition of 3% of dibutyl amine reduced the curing dose to 0.15 Mrad.

EXAMPLE 3

Using Resin A-1 the dosage to cure was determined with varying amounts of di-n-butyl amine according to the procedure of Example 1.

| Wt % di-n-butyl amine | Resin A-1 |
|---|---|
| None | 0.9–1.0 Mrad |
| 0.15 | 0.9 |
| 0.3 | 0.7 |
| 0.6 | 0.5–0.6 |
| 1.0 | 0.3–0.4 |
| 1.5 | 0.3 |
| 3 | 0.3 |

The tests showed at least about 0.3% is necessary. A minimum is found in the range of about 1.5 to 5% and no advantage is found above about 10%.

EXAMPLE 4

A vinyl ester resin was prepared by reacting 2-hydroxyethyl acrylate (25.55%) with phthalic anhydride (32.6%) to form a half ester. The half ester was then reacted with D.E.R. 331 (41.85%) to form the vinyl ester resin which was then mixed with a monomer in the proportions of 2/1 as before. Resin A-4 contained n-butyl acrylate and Resin B-4 contained styrene. Films were cast and cured by the procedure of Example 1.

| Nitrogen Additive (3%) | Resin A-4 | Resin B-4 |
|---|---|---|
| None | 1.1 Mrad | 1.8 Mrad |
| di-n-butyl amine | 0.3–0.4 | 1.0 |
| tetramethyl guanidine | 0.5–0.6 | 0.9–1.0 |
| 2-oxazoline | 0.4–0.5 | 1.0 |
| triethyl amine | 0.3–0.4 | — |
| morpholine | 0.4 | — |
| benzylamine | 0.8–0.9 | — |
| 2,2'-tetramethylene-bis(2-oxazoline) | 0.4–.5 | — |

It will be understood that the present invention is not limited to the specific details described above but may embody various modifications insofar as they are defined in the following claims.

What is claimed is:

1. A process for curing a mixture of a polymerizable vinyl ester resin and a nonvolatile vinyl monomer selected from the group consisting of alkenyl aromatics, vinyl carboxylic acids, vinyl nitriles, vinyl amides, alkyl and hydroxyalkyl esters of vinyl carboxylic acids wherein the alkyl group contains from 1 to 8 carbons, and mixtures thereof, said process comprises exposing said thermosettable mixture in an inert atmosphere to ionizing radiation, said mixture having added thereto about 1.5 to 5 weight percent based on the weight of the mixture of an amine having the formula $R_1R_2R_3N$ where $R_1$ is an alkyl or aralkyl group, $R_2$ is hydrogen and $R_3$ may be hydrogen or an alkyl group or $R_1$ and $R_3$ together may be a cyclic alkylene radical or an oxydialkylene radical; and wherein said vinyl ester resin is prepared by reacting about equivalent amounts of a polyepoxide of a polyhydric phenol having more than one epoxide group per molecule with a dicarboxylic acid half ester having the formula

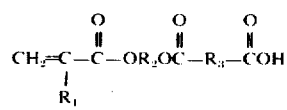

where $R_1$ is hydrogen or an alkyl group of 1 to 4 carbons, $R_2$ is an alkylene group of 2 to 6 carbons and $R_3$ is phenylene, cyclohexylene, alkylene or an unsaturated bivalent hydrocarbon radical.

2. The process of claim 1 wherein $R_3$ in the amine formula is hydrogen.

3. A thermosettable mixture suitable for curing by exposure to low levels of ionizing radiation comprising a mixture of a polymerizable vinyl ester resin and a nonvolatile monomer selected from the group consisting of alkenyl aromatics, vinyl carboxylic acids, vinyl nitriles, vinyl amides, alkyl and hydroxyalkyl esters of vinyl carboxylic acids wherein the alkyl group contains from 1 to 8 carbons, and mixtures thereof, said thermosettable mixture have added thereto about 1.5 to 5 weight percent based on the weight of the mixture of an amine having the formula $R_1R_2R_3N$ where $R_1$ is an alkyl or aralkyl group, $R_2$ is hydrogen and $R_3$ may be hydrogen or an alkyl group or $R_1$ and $R_3$ together may be a cyclic alkylene radical or an oxydialkylene radical; and wherein said vinyl ester resin is prepared by reacting about equivalent amounts of a polyepoxide of a polyhydric phenol having more than one epoxide group per molecule with a dicarboxylic acid half ester having the formula
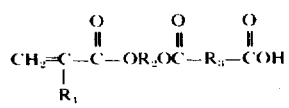
where $R_1$ is hydrogen or an alkyl group of 1 to 4 carbons, $R_2$ is an alkylene group of 2 to 6 carbons and $R_3$ is phenylene, cyclohexylene, alkylene or an unsaturated bivalent hydrocarbon radical.
4. The composition of claim 3 wherein and $R_3$ in the amine formula is hydrogen.
* * * * *